J. H. & J. Kiplinger.
Fly Trap.
Nº 88,044.
Patented Mar. 23, 1869.
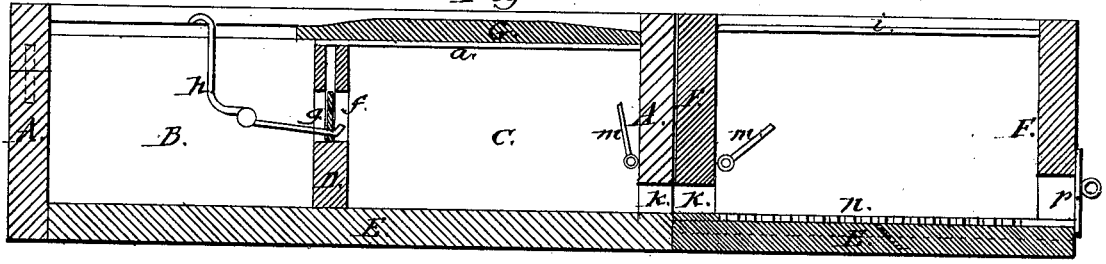
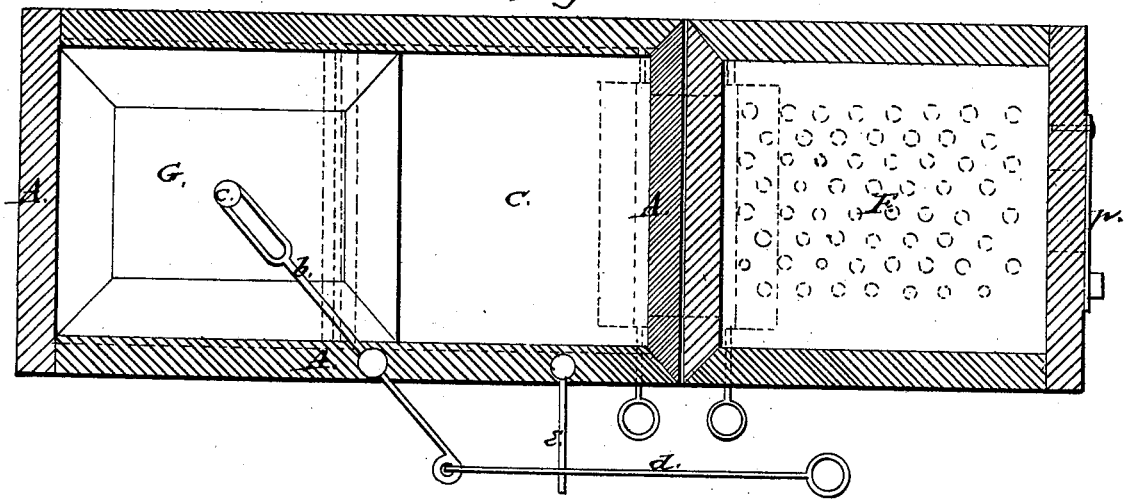
Witnesses:
Leopold Ebert
J. W. Thrall
Inventors:
Jno. H. Kiplinger
Jos. Kiplinger
per
Alexander & Mason
attorneys

United States Patent Office.

JOHN H KIPLINGER AND JOSEPH KIPLINGER, OF NORTH MANCHESTER, INDIANA.

Letters Patent No. 88,044, dated March 23, 1869.

IMPROVED FLY-TRAP.

The Schedule referred to in these Letters Patent and making part of the same.

*To all whom it may concern:*

Be it known that we, JOHN H. KIPLINGER and JOSEPH KIPLINGER, of North Manchester, in the county of Wabash, and in the State of Indiana, have invented a certain new and useful Improvement in Fly-Traps; and do hereby declare that the following is a full, clear, and exact description thereof, reference being had to the accompanying drawings, and to the letters of reference marked thereon.

The nature of our invention consists in the construction and arrangement of a "fly-trap," by the use of which flies can be successfully exterminated without the least trouble, and which we call "The Magic Fly-Trap."

In order to enable others skilled in the art to which our invention appertains, to make and use the same, we will now proceed to describe its construction and operation, referring to the annexed drawings, which form a part of this specification, and in which—

Figure 1 is a longitudinal vertical section; and
Figure 2 is a plan view.

A represents a rectangular box, divided into two chambers, B and C, by means of the partition D.

The bottom, E, of said box A, extends a suitable distance at one end, to allow another box, F, to be slipped on the same, the sides of this box F being, for this purpose, grooved, so as to let the bottom, E, fit into the same.

The chamber B is open at the top, but the chamber C is covered by a glass plate, *a*; and a sliding cover, G, which moves in grooves in the sides of the box, can be made to close the chamber B, or cover the glass plate over the chamber C, as desired.

This is effected by means of a lever, *b*, pivoted at a suitable point on the side of the box A, the inner end of said lever being slotted, and a screw, C, passed through the slot into the centre of the cover G.

The outer end of the lever *b*, is provided with a rod, *d*, having a suitable handle, and passing through an eye in the rod *e*, which is secured to the side of the box A, so as to hold the rod *d* up in a horizontal position.

The partition D is provided with an opening, *f*, by means of which the flies are allowed to pass from one chamber to the other.

This opening is closed by means of a slide, *g*, operated upon by two springs, *h*, pivoted, one at each side of the chamber B, and so arranged, that when the sliding cover G covers the chamber C, the slide will be down, closing the opening *f*, but when the cover G is moved, so as to close the chamber B, it will operate upon the ends of the springs *h* in such a manner as to raise the slide *g*, uncovering the opening, the upper part of the partition D being for this purpose slotted, as shown in fig. 1, so as to allow the slide to move freely upward.

The sliding box F is also covered with a glass or other transparent plate, *i*, and the ends of the boxes A and F, which are placed together, are provided with openings, *k k*, which may be closed by hinged doors, *m m*, operated from the outside of the boxes, so that the flies may be allowed to pass from the chamber C into the box F, when desired.

The box F is provided with a perforated bottom, *n*, and its outer end has also an opening, closed by a slide, *p*.

The operation of the fly-trap is very simple.

First sprinkle brown sugar in the bottom of the chamber B. In setting the trap for operation, the sliding cover G is cast back, by the attached lever *b*, over the chamber C. Flies will then gather into the chamber B. When it is sufficiently filled, the slide G is cast over the chamber B by a jerk of the lever, which thus closes that chamber, at the same time opening the drop *g*, by the springs *h h*, which causes the flies immediately to pass over into the chamber C, which is made light by the removing of the slide G. Then giving them a moment's time to pass into the chamber C, the slide is again cast back over this chamber by a push of the lever, which again causes said chamber to be darkened, and the slide *g* to descend, closing the opening *f*. The flies will then immediately pass into the box F, through the openings *k k*, being attracted by the light. In this box they remain until finally disposed of in the following manner:

When box F is sufficiently filled, the hinged shutters *m m* are turned down, which closes the passages *k k*. The box F is then slipped off from the bottom, E, and the flies destroyed by sand or water.

The box may be dipped into water, which passes in through the perforated bottom, *n*, or gravel or sand may be thrown in at the slide *p*, and shaken. Either way is sufficient to destroy the flies.

The trap requires no special tending. A person may easily attend to it while performing any usual labor.

Having thus fully described our invention,

What we claim as new, and desire to secure by Letters Patent, is—

1. The box A, constructed as described, with a slotted partition, D, dividing it into two chambers, said partition having an opening, *f*, and slide, or drop, *g*, which latter is operated, that is, raised and lowered, by the rapid transferring of the sliding cover G from one chamber to the other, substantially as herein set forth.

2. The box F, constructed as described, with a perforated bottom, *n*, glass or other transparent cover, *i*, opening *k*, and door *m*, at one end, corresponding with similar opening and door at the end of the box A, and at the other end with opening and slide *p*, all substantially as and for the purposes herein set forth.

3. The combination of the box A, divided into two chambers, B and C, elongated bottom, E, sliding box F, and sliding cover G, all constructed and operating substantially as and for the purposes herein set forth.

4. A fly-trap, constructed of a series of boxes, or chambers, having suitable passages and openings, to allow the flies to pass from one to the other, substantially as herein set forth.

In testimony that we claim the foregoing, we have hereunto set our hands, this 28th day of November, 1868.

JOHN H. KIPLINGER.
JOSEPH KIPLINGER.

Witnesses:
BENJAMIN WHITE,
PHILIP WALTER.